March 27, 1934.  W. S. BOWEN  1,952,308
FLUID TREATING DEVICE
Filed Nov. 25, 1931
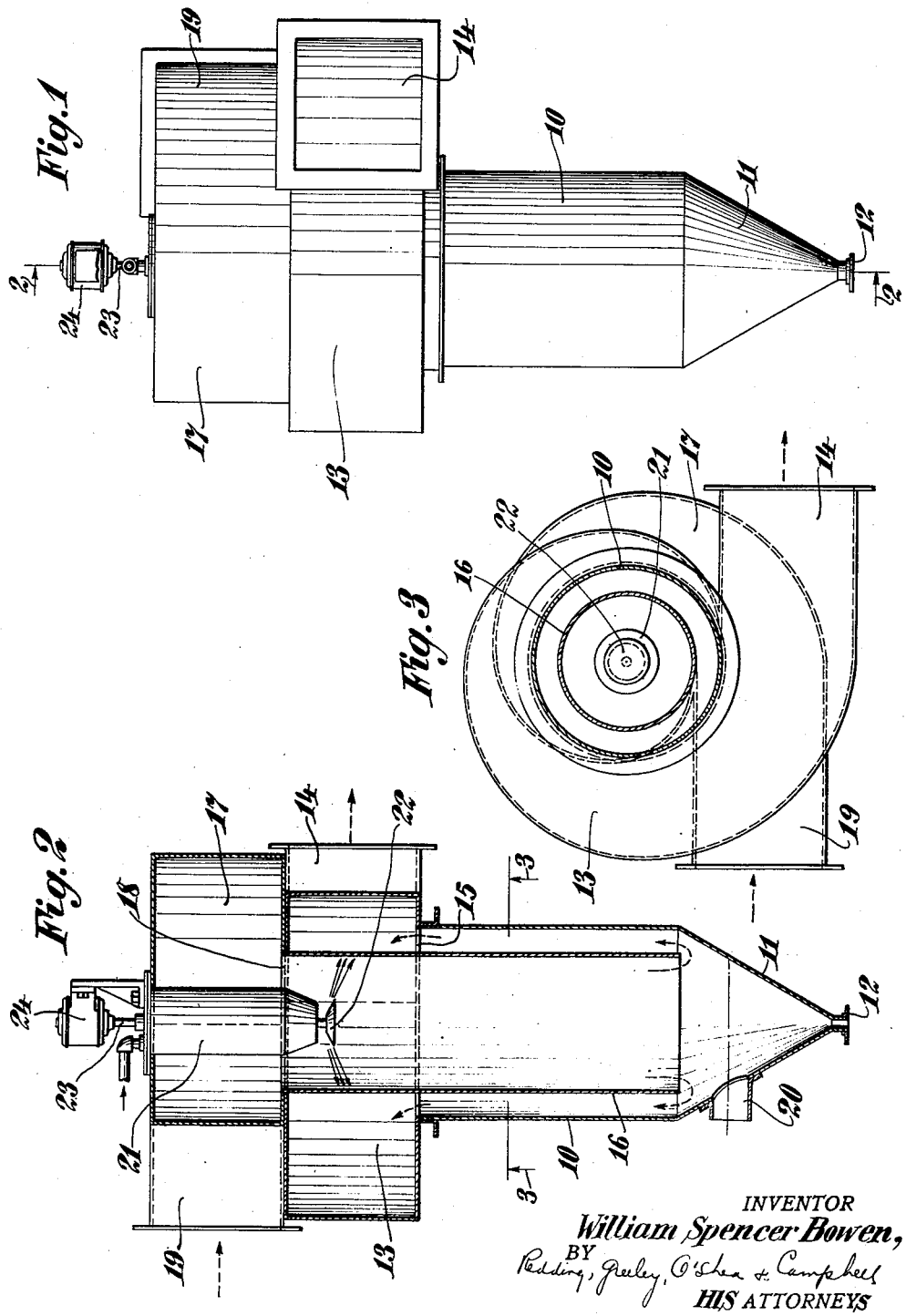
INVENTOR
William Spencer Bowen,
BY
Redding, Greeley, O'Shea & Campbell
HIS ATTORNEYS Patented Mar. 27, 1934

1,952,308

UNITED STATES PATENT OFFICE 1,952,308

FLUID TREATING DEVICE

William Spencer Bowen, Westfield, N. J.

Application November 25, 1931, Serial No. 577,183

1 Claim. (Cl. 183—21)

The present invention relates to devices for treating fluids and embodies, more specifically, an improved device for washing air wherein the current of air to be washed is directed through a suitable washing mechanism which effects the scrubbing of the air upon a wetted surface, the impurities carried therein being effectively separated and removed from the air which passes out in a purified condition.

While air is mentioned herein as the fluid which is treated, it will be apparent that the device may be used for treating any fluid, preferably of gaseous nature, and it will also be observed that the mechanism not only functions as a means for purifying air or other fluids but additionally serves as an effective separating or collecting means whereby solid particles in suspension in a fluid or gas are effectively separated therefrom and collected.

It is to be understood that devices have heretofore been designed embodying the principle of separating solids from gases centrifugally. Devices have also been provided wherein a treated surface is utilized as a medium for collecting solid particles from a current of air or gas which is directed against the treated surface. These principles broadly are not claimed as new herein but it has been found that a highly effective separation or cleaning action may be had in a mechanism utilizing the above principles in combination with an improved means for introducing the fluid to be treated into the treating chamber in such fashion that the said fluid is effectively acted upon by a liquid or other treating medium to cause the fluid to be directed effectively through the medium and against the wetted surfaces of the treating chamber.

An object of the invention, accordingly, is to provide a device for treating fluids in such fashion as to remove predetermined substances therefrom. In this connection while solid particles are mentioned herein as the impurities or substances separated from the fluids, it will be apparent that a mixture of fluids may be treated, one or more individual fluids of the mixture having a greater weight than other of the fluids or a greater affinity for a treating medium than other of the fluids.

A further object of the invention is to provide a device for separating and collecting predetermined substances from a fluid whereby the fluid to be treated is introduced into the device and, after treatment, emerges therefrom substantially free of the substances which are to be removed.

A further object of the invention is to provide a device for treating fluids and the like wherein the fluid to be treated is directed into a treating chamber in such fashion that a treating medium effectively cooperates therewith to cause the same to be effectively scrubbed against a suitable treating surface.

A further object of the invention is to provide a treating device wherein a fluid to be treated is introduced into a treating chamber and caused to engage a treating medium which effectively cooperates therewith to scrub the fluid against a treating surface over which the treating medium is passed.

A further object of the invention is to provide a device of the above character wherein fluid is introduced in a whirling manner through a spray of a treating medium, the fluid being introduced centrally of a treating chamber and directed outwardly against the walls thereof partially by the centrifugal action of the fluid and partially by a spray of treating medium against which the fluid is directed as it is introduced into the chamber.

The foregoing objects are attained by the provision of a treating device comprising a vertical treating chamber into which the fluid is introduced by means of a scroll connection whereby a whirling action is imparted to the fluid as it is introduced into the chamber, a nozzle being provided at the entrance to the treating chamber which directs a circular spray of a treating medium outwardly against the walls of the chamber, whereby the walls of the chamber are provided with a coating of the treating medium and the outwardly directed medium is engaged by the whirling fluid to direct the latter outwardly against the walls of the chamber and cause the same to be effectively scrubbed thereagainst.

Further objects, not specifically enumerated above, will be apparent as the invention is described in greater detail in connection with the accompanying drawing, wherein:

Figure 1 is a view in side elevation, showing a device constructed in accordance with the present invention.

Figure 2 is a view in section, taken on line 2—2 of Figure 1, and looking in the direction of the arrows.

Figure 3 is a bottom view in section, taken on line 3—3 of Figure 2, and looking in the direction of the arrows.

Referring to the above drawing, a housing 10 is shown as provided with a downwardly extending funnel-shaped bottom portion 11 having an outlet 12. This housing communicates with an outlet scroll 13 which is preferably mounted thereon and, in turn, communicates with a suitable outlet duct through its outlet portion 14. Fluid from the housing 10 passes upwardly into the outlet scroll through an annular opening 15 in the scroll which communicates with the interior of the housing 10.

Within the interior of the housing and axially disposed with respect thereto is a treating chamber 16 which is open at its lower extremity and depends from an inlet scroll 17. The inlet scroll 17 is formed with a central opening 18 which communicates directly with the interior of the treating chamber 16, thus directing fluid received from the entrance 19 of the inlet scroll 17 into the treating chamber 16 while imparting a whirl thereto in a manner which will be readily understood.

The treating chamber 16 and housing 10 are preferably of integral shape and are spaced apart, as seen in Figures 2 and 3 to afford an annular duct within the housing 10 through which the treated fluid is discharged into the outlet scroll 13. Within the conical or funnel-shaped bottom 11 of the housing 10 a water or treating medium level is maintained, as indicated in dot and dash lines in Figure 2. This level may be maintained by a suitable outlet 20, the outlet 12 being provided to permit the removal of sediment or other fluid or substance within the bottom 11 and below the level maintaining outlet 20. Where solid particles are present in the fluid to be treated, these particles may be collected in the bottom of the funnel-shaped portion 11 of housing 10 and removed through the outlet 12.

Centrally of the inlet scroll 17 and chamber 16, a cylindrical shell 21 having a nozzle is mounted, these nozzles being of such character as to direct a spray of the treating medium outwardly against the walls of the chamber 16. In the form shown the nozzle includes a rotating disc 22 which is mounted upon a shaft 23 and driven by a motor 24. The treating medium is introduced into the shell 21 through a pipe 23 and as it is discharged from the shell 21, the rotating disc 22 directs it outwardly in a circular jet against the interior walls of the treating chamber 16.

The operation of the foregoing mechanism thus includes the directing of the fluid to be treated into the inlet scroll 17 and introducing it into the treating chamber 16 with the whirling action imparted by means of the scroll 17. The great turbulence of the fluid is increased by its contact with the outwardly directed jet of the treating medium produced by the shell 21. The fluid is thus entrained in the jet of treating medium and is directed outwardly against the surface of the chamber 16 upon which the treating medium is present, the resulting violent action effectively scrubbing the fluid frictionally against the treated surface of the chamber 16 and removing predetermined substances therefrom. The current of fluid which is introduced into the chamber is thus bent forwardly and its course changed by the atomized treating medium from the shell 21.

It will thus be seen that the device may be used for treating fluids to separate therefrom either solid particles or fluids which either adhere to the treating medium more effectively than other fluids present and are thus separated therefrom, or by the difference in centrifugal action of one fluid over another, or by absorption due to chemical reaction with the treating medium. In the event that a fluid is to be separated from the treated fluid, the outlet of housing 10 may be designed in such fashion that the fluid removed may be effectively discharged in addition to providing the water seal at the bottom of the housing as described above.

While the invention has been described with specific reference to the accompanying drawing, it is not to be limited, save as defined in the appended claim.

I claim as my invention:

A treating chamber, means disposed centrally of the chamber and adjacent the entrance thereof to direct a spray of a treating medium against the walls of the chamber, a cylindrical shell above the last named means having a tapering extension to form an annular inlet having an expansion nozzle at the spray directing means, an inlet chamber of greater area than the cross sectional area of the treating chamber and adapted to receive fluid under greater pressure than the pressure in the treating chamber, said inlet chamber having means to impart a centrifugal motion to a fluid to be treated and direct the same into the nozzle centrally of the chamber and against the spray of treating medium, whereby a substantial drop in pressure and increase in velocity takes place adjacent the nozzle and above the spray, and an outlet for the fluid.

WILLIAM SPENCER BOWEN.